Figure 1:
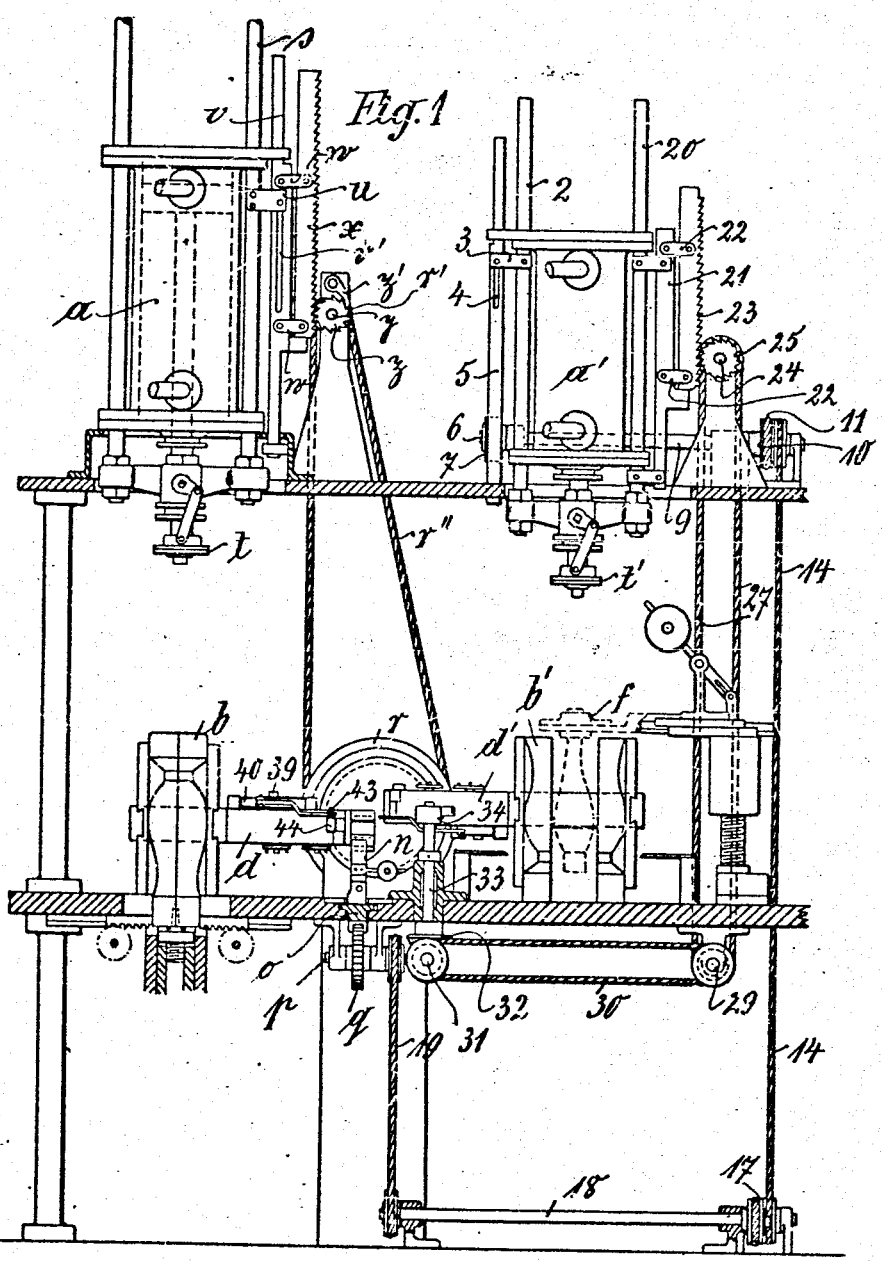

H. HILDE.
GLASS BLOWING MACHINE.
APPLICATION FILED MAR. 22, 1907.

915,960.

Patented Mar. 23, 1909.

5 SHEETS—SHEET 1.

H. HILDE.
GLASS BLOWING MACHINE.
APPLICATION FILED MAR. 22, 1907.
915,960.
Patented Mar. 23, 1909.
5 SHEETS—SHEET 2.
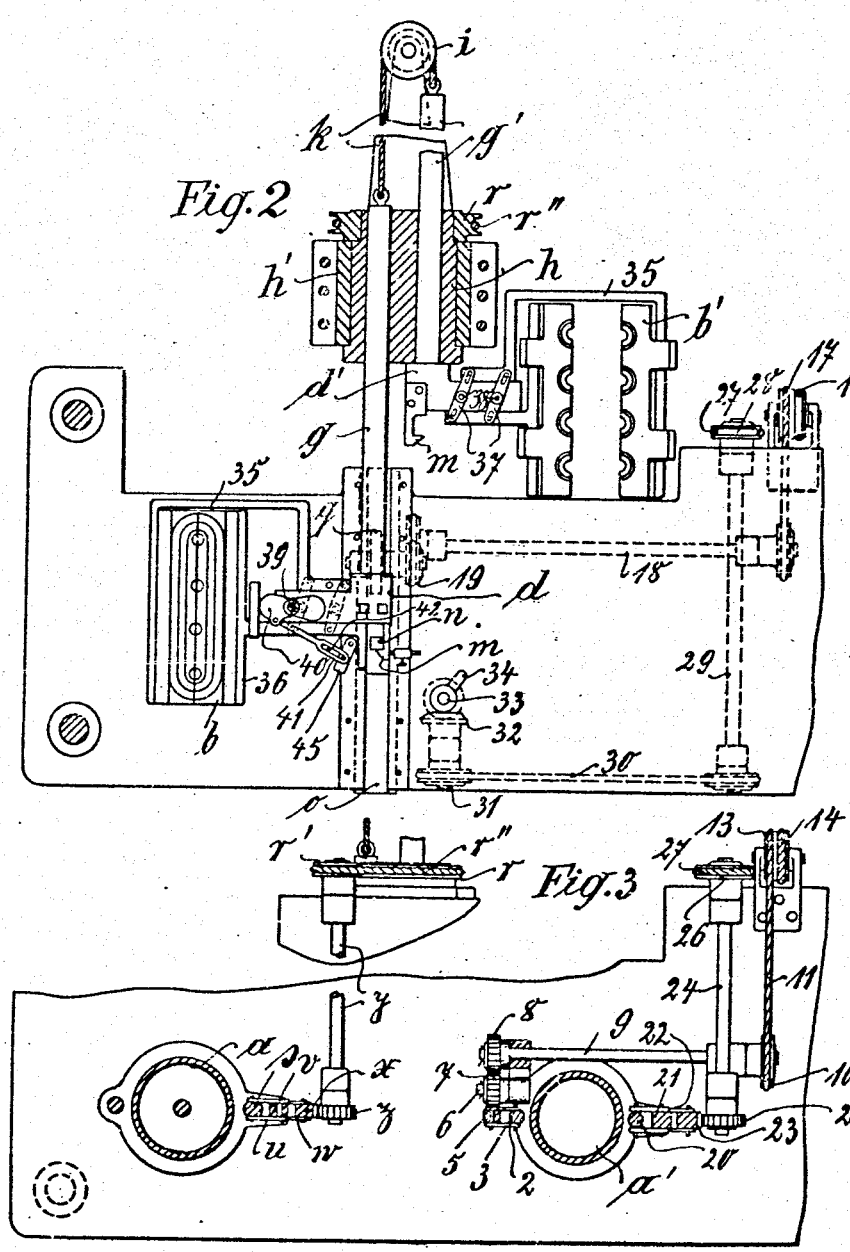

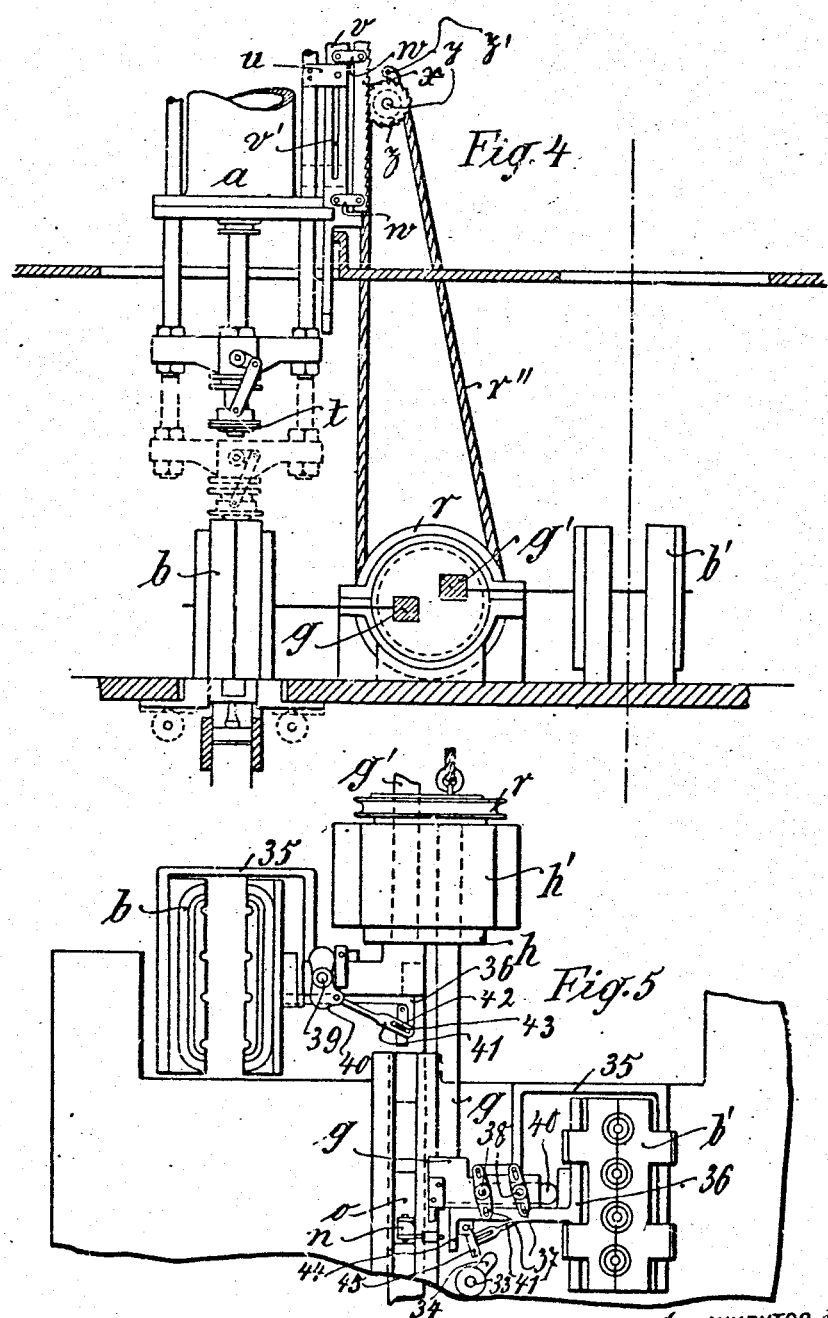

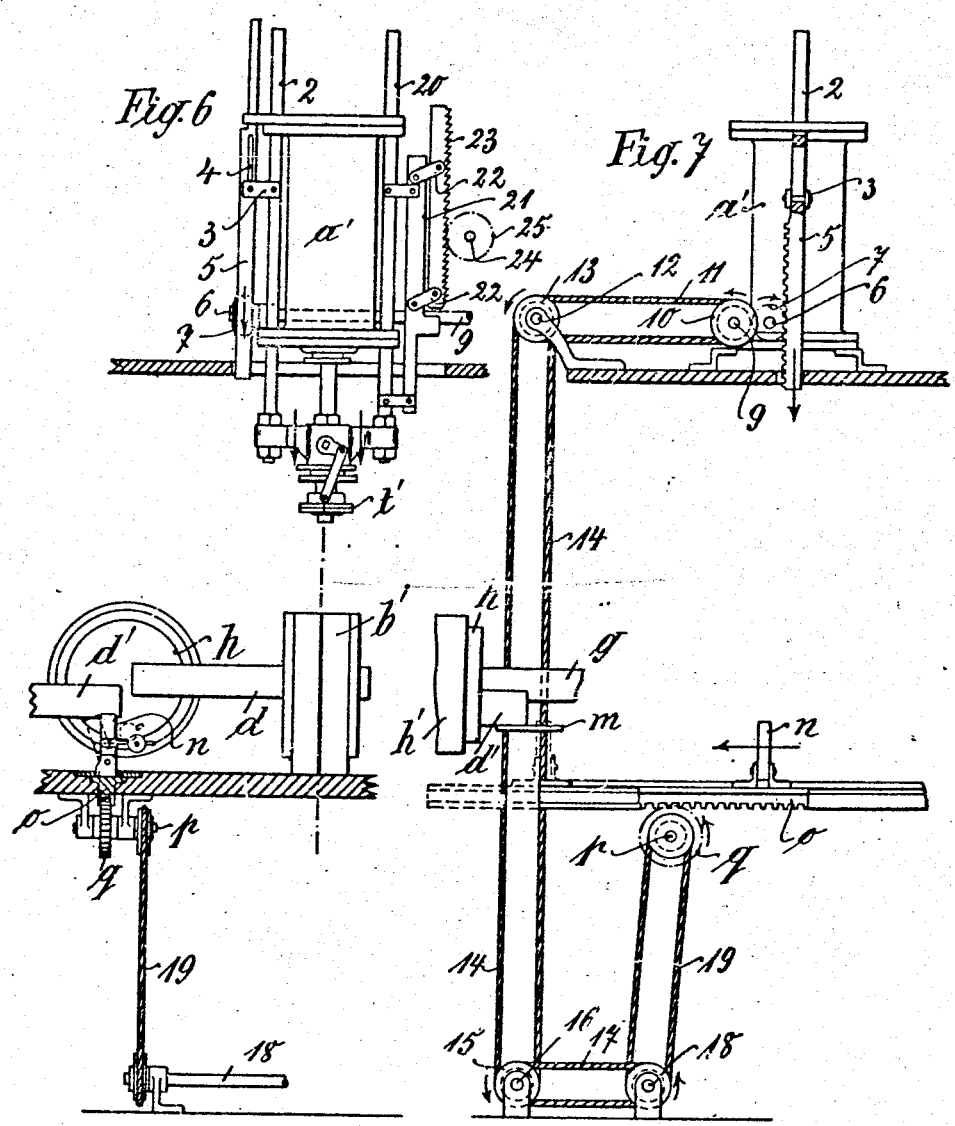

H. HILDE.
GLASS BLOWING MACHINE.
APPLICATION FILED MAR. 22, 1907.
915,960.
Patented Mar. 23, 1909.
5 SHEETS—SHEET 5.
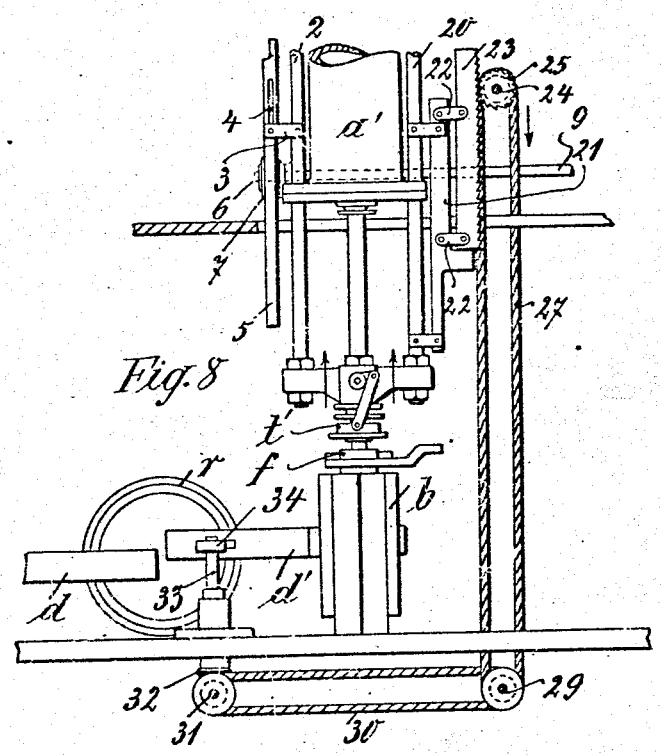
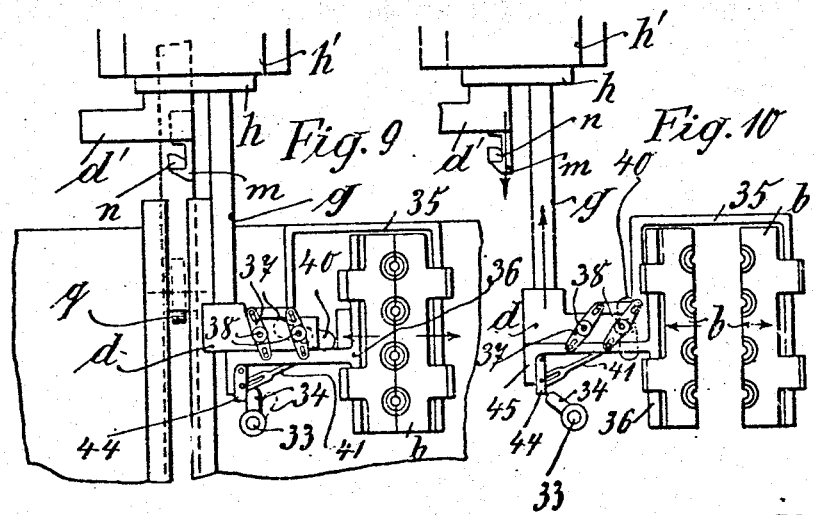
WITNESSES:
David Levine
H. J. Suhrker.
INVENTOR
Hermann Hilde
BY
ATTORNEYS.

UNITED STATES PATENT OFFICE.

HERMANN HILDE, OF ROSSWEIN, GERMANY.

GLASS-BLOWING MACHINE.

No. 915,960.    Specification of Letters Patent.    Patented March 23, 1909.

Application filed March 22, 1907. Serial No. 363,952.

*To all whom it may concern:*

Be it known that I, HERMANN HILDE, a citizen of the German Empire, residing in Rosswein, in said Empire, have invented certain new and useful Improvements in Glass-Blowing Machines, of which the following is a specification.

The present invention relates to glass-blowing machines for blowing hollow glass objects, and more particularly to machines in which the blank which is held in the preparatory mold, while the latter stands upside down on the machine table, is preliminarily pressed into shape by a compressed-air blow head, after which the preliminary mold is swung over to the blow head by which the blank is roughly blown while said mold is in upright position. The blank is then taken out of mold and transferred to the finishing blowing device. In the machines of this character at present in use there is usually but one mold, which is fixed to a shaft journaled on the machine-table between the compressed-air blow heads of the pressing and blowing devices. By this shaft the mold is swung to and fro between the two devices. With a view to relieving the attendant, the swinging axis is so coupled to the first blow head that on the rising of the latter the mold is automatically swung beneath the second or blowing blow head, and after the blowing and discharging have been effected the mold is swung back again by the rising of such second blow head. The movement of the blow heads in this type of machine is mechanically produced by compressed-air cylinders controlled by the workmen.

The present invention aims to increase the capacity of the machine by providing two molds which are movable about a common axis.

A further object of the invention is to provide a machine in which the molds during the operations of pressing and blowing stand on the machine-table and under the respective blow heads. Accordingly a special arrangement of the molds on the swinging axis becomes necessary, so that they can be swung in a circle without abutting against the table of the machine. While the full mold is swinging around at the top, the empty one comes around at the bottom, so that it is necessary that the molds be displaceable along their axis in order that the empty one may be moved laterally beyond the table of the machine and after swinging back be moved back under the pressing blow head. In the present invention, for a further relief of the attendant, the movement of the molds is effected automatically by connections with the compressed-air blow heads, which are mechanically operated.

With these ends in view, the new machine is so devised that on the first compressed-air blow head moving back after the pressing operation, the preparatory mold, which has been standing upside down beneath said blow head, is turned through 180° and transferred over to the blowing device; at the same time the preparatory mold of the blowing device swings back to the pressing or head-forming device. When the second blow head, belonging to the blowing device, rises, the mold beneath the same is automatically opened and the reciprocal movement of the molds is automatically effected in such a way that the first mold, of the pressing device, is brought onto the machine-table in position for use, while the other mold is moved backward beyond said table. In this manner the operator is quite materially relieved, as he has no other duty but to close the mold contained within the head-forming or pressing device and to keep the machine running in the usual way by controlling the blow heads.

In the accompanying drawings, in which the same reference characters denote the same parts throughout the figures, Figure 1 is an elevation of a glass-blowing machine constructed in accordance with the invention, the blow heads being raised and one of the molds being open and the other closed, Figs. 2 and 3 are detail horizontal sections of Fig. 1, Fig. 4 shows in detail the head-forming device with its head-form open and the pressing blow head moving upward, Fig. 5 is a plan of Fig. 4, Fig. 6 is a front view of the blowing device with its blow head moving downward, Fig. 7 is an end view of Fig. 6, Fig. 8 is a front view of the blowing device with its blow head moving upward, and Figs. 9 and 10 show in plan the device for unbolting and opening the molds.

In the drawings $b\ b'$ denote the preparatory molds which are to be interchanged, *i. e.* to be brought alternately into coöperative relation with the head-shaping or pressing device $a$ and the blowing device $a'$. These molds are mounted on the table of the machine and the pressing device and blowing device are arranged side by side above said table, as shown in Fig. 1. The molds $b$ $b'$ are attached to arms $d$ $d'$ which extend laterally from sliding bars $g$ $g'$ which are movable in forward and backward direction, and parallel with each other, over the machine-table, as shown in Fig. 2. Said sliding bars are movable longitudinally in a box $h$ which is mounted to rotate about its axis in a bearing $h'$. The box $h$ carries a rearwardly directed extension at the end of which a roller $i$ is mounted over which a rope $k$, connecting the sliding bars $g$ $g'$, is passed in order to produce the movement of said bars in opposite directions. Both sliding bars $g$ $g'$ carry at their ends, which are directed toward the table, hooks $m$ behind which at a given moment a catch $n$ carried by a rack-slide $o$ engages itself in order to couple one or the other of said bars with said slide. Said slide is movable in forward and backward direction in a guide in the machine-table and has formed on its under surface a rack which engages a toothed wheel or pinion $q$ mounted on a shaft $p$ under the table. Said shaft can be put in motion by means of a system of gearing to be presently described.

The pressing device $a$ is provided with a blow head $t$ guided vertically. The guide-rod $s$ of said blow head has applied thereto a plate $u$ which slides vertically in a slot $v'$ of a rack-slide $v$ which is movable in fixed guides. By means of links $w$ a vertically moving rack $x$ is linked to this slide, and said rack engages with a toothed wheel $z$ fixed on a shaft $y$, as shown in Figs. 1 and 3. The rack $x$ is so arranged, by means of the links $w$, that, yielding upwardly on the descent of the slide $v$, it is disengaged from the toothed wheel $z$ and thus becomes free to move downwardly without setting the shaft $y$ in motion. A pawl $z'$ coacting with the wheel $s$ prevents the shaft $y$ from turning in the wrong direction. At the other end of the shaft $y$ a rope-pulley $r'$ is fixed from which, by means of a rope $r''$ and a second pulley $r$, rotary motion is transmitted to the box $h$ in which the bars $g$ $g'$ are guided, so that said box is rotated in the bearing $h'$.

The blowing device $a'$ is provided with a blow head $t'$ similar to the blow head $t$. The guide-rod 2 of this blow head $t'$ carries a laterally extending plate 3 which engages a slot 4 provided in a vertically moving rack 5. Said rack is movable in suitable fixed guides and engages a toothed wheel or pinion 7 moving loosely on a pivot 6, as shown in Fig. 3. Said wheel transmits rotary motion to another and similar wheel 8 mounted on a shaft 9 at the opposite end of which—there is a rope-pulley 10. By means of the pulley 10 and a rope 11 rotary motion is transmitted to a double pulley 13 fixed to a shaft 12. A rope 14 connects said double pulley with a pulley 15 having a shaft 16, which is, by the rope-drive 17, connected with the shaft 18. By the rope-drive 19 said last-named shaft is connected with the shaft $p$. Accordingly the downward displacement of the rack 5 produces, on the blow head $t'$ descending, the movement of the rack-slide $o$, through the toothed wheel $q$. To the other guide-rod 20 of the blow head $t'$ is attached a plate 21 to which a rack 23 is connected by means of links 22 so as to be movable upwardly. Said rack meshes with a toothed wheel 25 fixed on a shaft 24. On the shaft 24, at the end opposite the wheel 25, is a rope-pulley 26 from which rotary motion is imparted by means of a rope 27 to a rope-pulley 28 mounted upon a shaft 29. Said pulley 28 is connected by a rope-drive 30 to the horizontal shaft 31 which rotates, by means of a pair of bevel gears, an upright shaft 33. When the blow head $t'$ is rising an entire turn is imparted by the gearing just described to said shaft 33 at the upper end of which a thumb-disk 34 is secured. The thumb on said disk is provided for the purpose of releasing the lid of the mold, and then in the further course of its motion to open such mold. The molds $b$ $b'$, which as usual are divided lengthwise, are held by frame-parts 35 and 36 which are adjustably movable on the arms $d$ $d'$. By means of two-armed levers 37 movable about bolts 38 on the arms $d$ $d'$ both frame-parts 35, 36 are in reciprocal connection, so that on displacing part 36 the other part 35 is displaced in the opposite direction.

Between corresponding heads of the frame-parts 35, 36 on the arms $d$ $d'$ a movable plug 40 of elongated shape is movable about a bolt 39. On closing the mold said plug is to be moved by hand into the position shown in Fig. 2 at the left. On one leg of this plug 40 a draw-rod 41 operates, the extremity of which is provided with a slot 42 which passes over the pivot 43 of a latch 44 on the frame-part 36. The length of the draw-rod 41 and the slot 42 is so dimensioned that, on the plug occupying the closing position, the latch 44 will be moved away from its back-ledge 45 by the draw-rod 41, so that when the thumb 34 abuts against the latch 44 the latter is moved back to the butt end of the back-ledge 45 of the frame-part 36. In this way the plug 40 is given such an oblique position that, being moved back by the thumb 34, it can be adjusted in an oblique position to arm $d$ or $d'$.

The operation of the improved machine is as follows: Supposing the mold $b$ to be closed and placed vertically under the blow head $t$ of the pressing or head-shaping device $a$ and the blank previously blown to have been freed in the blowing device $a'$ by opening the mold $b$, then on the descent of blow head $t$ the rack $x$ will pass by the toothed wheel $z$ without setting the shaft $y$ in motion. When, after shaping the head of the blank and after the usual opening of the divided head-mold held fast on the machine-table, the blow head $t$ is moved upwardly again, this causes the plate $v$ to carry along the slide $r$ with the rack $x$. Said rack through the toothed wheel $z$ and shaft $y$ operates the driving gear $r$ $r'$ $r''$ in such a manner that the box $h$ will be turned through 180° so that the mold $b$, which before stood upside down on the table, is now moved upright under the blowing device $a'$. At the same time the mold $b'$ is swung over in opposite direction and takes the place of mold $b$, with its head downward, with the difference, however, that said mold $b'$, having been previously moved backwardly beyond the table, is still behind the blow head $t$. After the head-part of the blank protruding from the mold $b$ has been inclosed by the head-mold $f$ associated in the usual way with the blowing device, the blow head $t'$ is moved down on the mold $b'$ and the blank roughly blown. On this downward movement of blow head $t'$ the rack 5 is moved downwardly and through the medium of the wheels 7, 8, the shaft 18, the rope-drive 19 and the toothed wheel $q$, the rack-slide $o$ is moved backward so that its catch $n$ engages behind the hook $m$ of the sliding bar $g'$. In this way said sliding bar is coupled with the slide $o$. When the blow head $t'$ is raised again, then at the very outset of its upward movement the rack 23, through the connections described, rotates the upright shaft 33 and thumb-disk 34 so that the latter unbolts the mold-frame 35, 36 in the manner above described in order to set the blank free. On opening the mold $b$ the plate 3 will have reached the end of the slot 4, and accordingly the rack 5 will be forced to follow the upward movement of the blow head. Hence said rack through the connections described will push forward the rack-slide $o$ whereby the sliding bar $g'$ will be moved forward and the sliding bar $g$ moved backward. The latter sliding bar carries along with it the mold $b$, which will be moved backward beyond the edge of the table. When the blow head $t$ of the head-shaping device is moved upwardly again, said mold $b$ will be swung back within reach of the head-shaping device, as before described. At the same time the mold $b$ is moved backward the mold $b'$ is moved forward into position on the machine-table under the blow head $t$. The halves are then closed by hand, whereupon the above described operation can recommence.

Having thus described my invention, I claim as new and desire to secure by Letters Patent:

1. In a glass-blowing machine, the combination, with a fixed table and blow heads mounted above the same, of molds arranged to swing vertically between said blow heads and which rest on said table during operation.

2. In a glass-blowing machine, the combination, with pressing and blowing blow heads arranged side by side, of molds arranged to swing vertically between said blow heads, and a fixed table on which the molds are supported during the pressing and blowing operations.

3. In a glass-blowing machine, the combination, with a fixed table and a blow head above the same, of a mold arranged to swing vertically into position to coöperate with said blow head and to be shifted laterally in order to be supported on said table.

4. In a glass-blowing machine, the combination, with a fixed table and blow heads above the same, of molds arranged to swing vertically between said blow heads and to be moved laterally with respect to the table.

5. In a glass-blowing machine, the combination, with a table and blow heads mounted above the same, of molds mounted to swing vertically in a circle at one side of the table, and means to automatically move the molds over the table so as to be supported thereon.

6. In a glass-blowing machine, the combination, with a table, of blow heads supported above the same, and molds mounted to swing in a circle beneath said blow heads, said molds being supported on said table during the pressing and blowing operations.

7. In a glass-blowing machine, the combination, with blow heads, of molds mounted to swing between the blow heads about a common axis and movable longitudinally of said axis.

8. In a glass-blowing machine, the combination, with blow heads, of molds mounted to swing circularly beneath the same about a common axis, said molds being movable in opposite directions along said axis.

9. The combination, with the blow heads, of molds mounted to swing about a common axis and displaceable longitudinally of said axis, and connections between said molds whereby they are so displaced simultaneously.

10. The combination, with blow heads, of molds mounted to swing about a common axis and displaceable longitudinally of said axis, and connections between said molds whereby they are so displaced in opposite directions.

11. The combination, with a table and blow heads, of molds mounted to move vertically in a circle, and means to move said molds laterally with respect to said table.

12. In a glass-blowing machine, the combination, with movable blow heads and swinging molds, of a connection between said molds and one of said blow heads whereby the molds are swung through 180°.

13. In a glass-blowing machine, the combination, with movable blow heads and swinging molds, of means connecting said molds with one of said blow heads whereby when the latter is raised the position of the molds with respect to the blow heads is reversed.

14. The combination, with a pressing blow head and a blowing blow head, of swinging molds beneath the same, and a connection between the pressing blow head and said molds whereby when the former is withdrawn from operative position the latter are so swung that their positions with respect to the blow heads are reversed.

15. The combination, with a vertically moving pressing blow head and swinging molds, of a rope-drive connecting said parts and by which the raising of the blow head causes the swinging of the molds about their common axis.

16. In a glass-blowing machine, the combination, with a blowing blow head and swinging molds, of means connecting said parts whereby the mold containing the blown lump is automatically opened.

17. In a glass-blowing machine, the combination, with a vertically moving blowing blow head and molds, of means whereby the upward movement of said blow head causes the mold containing the blown blank to be automatically opened.

18. In a glass-blowing machine, the combination, with a vertically moving blowing blow head and swinging molds, of opening mechanism for the molds, comprising a thumb-disk 34 and its connections with said blowing blow head.

19. In a glass-blowing machine, the combination, with a vertically moving blowing blow head, and swinging, axially displaceable molds, of means whereby the upward movement of said blow head automatically produces the opening of the mold containing the blown blank and the axial displacement of the molds.

20. In a glass-blowing machine, the combination, with pressing and blowing blow heads, and circularly moving molds beneath the same, of a connection between the pressing blow head and said molds whereby the latter are swung between the blow heads, and mechanism connecting said blowing blow head with said molds whereby the latter are displaced along their common axis.

21. In a glass-blowing machine, the combination, with a table, of blow heads mounted above the same, molds mounted to swing vertically in a circle beneath said blow heads, means connecting said molds with one of said blow heads whereby the former are automatically swung between the blow heads, and means connecting said molds with the other blow head whereby the former are moved laterally with respect to said table.

22. The combination, with a table, and molds mounted to swing circularly in a vertical plane, of blow heads above said table, means whereby the actuation of one blow head causes the molds to be moved circularly, and means whereby the actuation of the other blow head causes the molds to be shifted longitudinally along their common axis.

23. The combination, with a table, of molds mounted to swing about a common axis, a pressing blow head, a blowing blow head, means automatically operated by the former blow head whereby the molds are swung about their axis, and means automatically operated by the blowing blow head whereby the molds are laterally moved in opposite directions with respect to said table.

24. In a glass-blowing machine, the combination, with a table and vertically moving pressing and blowing blow heads, of molds mounted to swing vertically in a circle between said blow heads and displaceable longitudinally with respect to their common axis so as to be movable over said table, a connection between said molds and the pressing blow head whereby the raising of the latter causes the molds to be swung between the blow heads, and means operated on the raising of the blowing blow head for displacing said molds axially.

25. In a glass-blowing machine, the combination, with the blow heads, of a rotary box, slide-bars movable through said box, and molds carried by said slide-bars.

26. In a glass-blowing machine, the combination, with blow heads, of a box mounted beneath the same for rotation in a vertical plane, horizontal bars slidable through said box, molds mounted on said bars, and means for rotating said box.

27. In a glass-blowing machine, the combination, with blow heads, of a box mounted below the same to rotate in a vertical plane, bars slidable through said box, molds mounted on said bars, a connection between said bars whereby they are simultaneously moved through said box in opposite directions, and means connecting said box with one of said blow heads whereby the former is automatically rotated.

28. In a glass-blowing machine, the combination, with a table and blow heads mounted above the same, of a box mounted for rotation above and behind said table, mold-carrying bars slidable through said box and over the table, means connecting said bars whereby they are moved oppositely, means for rotating said box, and means for alternately pulling said bars in forward direction.

29. In a glass-blowing machine, the combination, with a table and blow heads mounted above the same, of a box rotatable in a vertical plane behind said table, bars movable in forward and backward direction through said box and over said table, molds carried by said bars at their forward ends, a connection between said bars whereby they are moved oppositely, means for rotating said box, and means for pulling said bars through the latter.

In testimony, that I claim the foregoing as my invention, I have signed my name in presence of two subscribing witnesses.

HERMANN HILDE.

Witnesses:
 HERM. TACK,
 RUDOLPH FRICKE.